US010522801B2

(12) United States Patent
Kronke et al.

(10) Patent No.: US 10,522,801 B2
(45) Date of Patent: Dec. 31, 2019

(54) MODULAR ENERGY STORAGE SYSTEM

(71) Applicant: Younicos Inc., Kyle, TX (US)

(72) Inventors: Tom Kronke, Austin, TX (US); Sriram Sarma Emani, Austin, TX (US); Stephen Frank, Austin, TX (US); Melaku Mihret, Austin, TX (US); Eric Schrock, Buda, TX (US); Richard Jennings, San Antonio, TX (US); Randal Lee, Austin, TX (US); Brian Taraba, Kyle, TX (US)

(73) Assignee: Younicos, Inc., Kyle, TX (US)

( * ) Notice: Subject to any disclaimer, the term of this patent is extended or adjusted under 35 U.S.C. 154(b) by 587 days.

(21) Appl. No.: 15/261,576

(22) Filed: Sep. 9, 2016

(65) Prior Publication Data

US 2017/0077467 A1 Mar. 16, 2017

Related U.S. Application Data

(60) Provisional application No. 62/217,717, filed on Sep. 11, 2015.

(51) Int. Cl.
*H01M 2/10* (2006.01)
*H01M 10/613* (2014.01)
(Continued)

(52) U.S. Cl.
CPC ........... *H01M 2/1077* (2013.01); *A62C 31/00* (2013.01); *H01M 8/04074* (2013.01); *H01M 10/613* (2015.04); *H01M 10/627* (2015.04); *H01M 10/63* (2015.04); *H01M 10/633* (2015.04); *H01M 10/635* (2015.04);
(Continued)

(58) Field of Classification Search
None
See application file for complete search history.

(56) References Cited

U.S. PATENT DOCUMENTS

| 4,992,669 A | 2/1991 | Parmley |
| 6,109,053 A | 8/2000 | Strackbein et al. |

(Continued)

FOREIGN PATENT DOCUMENTS

| CN | 201877477 U | 6/2011 |
| DE | 2430424 | 1/1976 |

(Continued)

OTHER PUBLICATIONS

International Search Report and Written Opinion issued in corresponding application No. PCT/US2016/051078 dated Nov. 29, 2016.

*Primary Examiner* — Wyatt P McConnell
(74) *Attorney, Agent, or Firm* — Moore Intellectual Property Law, PLLC

(57) ABSTRACT

A modular energy storage system includes a housing, a plurality of energy storage devices, a first door assembly and a second door assembly. The housing includes a first end and a second end. The plurality of energy storage devices are coupled within the housing. The first door assembly is pivotally coupled to the first end of the housing. The second door assembly is pivotally coupled to the first end of the housing adjacent the first door assembly. The first and second door assemblies each comprise an air distribution member configured to distribute and direct a cooling air flow toward the plurality of energy storage devices to absorb heat energy from the plurality of energy storage devices.

18 Claims, 7 Drawing Sheets

(51) Int. Cl.
  *H01M 10/627* (2014.01)
  *H01M 10/633* (2014.01)
  *H01M 10/647* (2014.01)
  *H01M 10/663* (2014.01)
  *H01M 8/04007* (2016.01)
  *A62C 31/00* (2006.01)
  *H01M 10/63* (2014.01)
  *H01M 10/6563* (2014.01)
  *H01M 10/635* (2014.01)
  *H01M 10/6565* (2014.01)

(52) U.S. Cl.
  CPC ..... *H01M 10/647* (2015.04); *H01M 10/6563* (2015.04); *H01M 10/6565* (2015.04); *H01M 10/663* (2015.04); H01M 2220/10 (2013.01); H01M 2250/10 (2013.01); Y02B 90/14 (2013.01)

(56) References Cited

U.S. PATENT DOCUMENTS

| | | |
|---|---|---|
| 6,164,369 A | 12/2000 | Stoller |
| 7,793,467 B1 | 9/2010 | Melton et al. |
| 2005/0225936 A1 | 10/2005 | Day |
| 2006/0012948 A1 | 1/2006 | Norris et al. |
| 2007/0230094 A1 | 10/2007 | Carlson |
| 2008/0055846 A1 | 3/2008 | Clidaras et al. |
| 2008/0060372 A1 | 3/2008 | Hillis et al. |
| 2008/0196758 A1 | 8/2008 | McGuire |
| 2008/0222971 A1 | 9/2008 | Thrue |
| 2010/0060016 A1 | 3/2010 | Hunter |
| 2010/0091434 A1 | 4/2010 | Pereira et al. |
| 2010/0103592 A1 | 4/2010 | Neumann et al. |
| 2010/0103606 A1 | 4/2010 | Olesiewicz et al. |
| 2010/0300721 A1 | 12/2010 | Ladewig et al. |
| 2010/0301672 A1 | 12/2010 | Di Cristofaro |
| 2013/0107448 A1 | 5/2013 | Hamburgen et al. |
| 2015/0216078 A1 | 6/2015 | Edmundsson et al. |

FOREIGN PATENT DOCUMENTS

| | | |
|---|---|---|
| DE | 19637047 A1 | 3/1998 |
| DE | 102009009860 | 11/2010 |
| EP | 0209027 | 1/1987 |
| EP | 0343356 | 11/1989 |
| EP | 0372220 | 6/1990 |
| EP | 0768741 | 4/1997 |
| EP | 2498588 | 9/2012 |
| EP | 2 642 584 A2 | 9/2013 |
| EP | 2822178 A1 | 1/2015 |
| EP | 2882052 | 8/2015 |
| FR | 2341972 | 9/1977 |
| FR | 2762153 A1 | 10/1998 |
| FR | 2915030 A1 | 10/2008 |
| GB | 2463098 A | 3/2010 |
| GB | 2500196 | 9/2013 |
| JP | 2012-084486 A | 4/2012 |
| WO | WO2007/001024 | 1/2007 |
| WO | WO2009/129900 | 10/2009 |
| WO | WO2014180013 | 11/2014 |

MODULAR ENERGY STORAGE SYSTEM

CROSS-REFERENCE TO RELATED PATENT APPLICATIONS

This application claims the benefit of and priority to U.S. Provisional Application No. 62/217,717, filed on Sep. 11, 2015, the entire disclosure of which is incorporated by reference herein.

BACKGROUND

The present application relates generally to energy storage systems. More specifically, the present application relates to a modular energy storage system.

Generally speaking, renewable energy power sources, such as wind turbines and photovoltaics, can provide intermittent power to an electrical power grid. A modular energy storage system can be used in conjunction with a renewable energy power source to provide or absorb power to smooth power output from the renewable power source to the grid. In addition, a modular energy storage system can be used in a remote geographic location or a natural disaster site to, for example, provide supplemental power to the grid. Typically, many modular energy storage systems utilize a large enclosure, such as an ISO shipping container, which can contain energy storage devices (e.g., batteries, etc.), power conversion equipment, and the like, to store and/or provide power on demand. These modular systems can be deployed to geographic locations where, for example, power smoothing or supplemental power is needed.

Many of these modular systems, however, are not optimized for use in remote applications, such as in undeveloped areas or natural disaster sites, due, in part, to the need for necessary infrastructure and large space requirements to support the systems. Additionally, many of these systems are not space optimized and have poor thermal management, which can result in equipment failures and low operating performance. For example, some conventional energy storage systems provide cooling for the power electronics contained therein by using fans and/or by providing openings in, for example, an enclosure, to allow an air flow from ambient to enter the enclosure. Generally speaking, the air flow is not controlled or directed once it enters the enclosure, nor is it distributed to the various electronic equipment contained therein. Ultimately, this can result in uneven and unsatisfactory cooling of the power electronics (e.g., batteries, power conversion equipment, etc.).

Additionally, some modular energy storage systems include power conversion equipment to allow for the conversion of AC to DC power, or vice versa, when operating the energy storage devices in conjunction with a renewable energy power source and/or the grid. Most power conversion equipment is mounted or contained within a separate housing located within a modular enclosure. These separate housings, generally, do not allow for adequate cooling of the power conversion electronics contained therein. In addition, these separate housings can be cumbersome and can be difficult to transport or maneuver.

Thus, there is a need for an improved modular energy storage system that is space optimized and has improved thermal management capabilities. In addition, there is a need for a mounting arrangement for power conversion equipment that allows for, among other advantages, improved temperature control/cooling within a modular energy storage system. These and other advantageous features will become apparent to those reviewing the present disclosure.

SUMMARY

One embodiment relates to a modular energy storage system including a housing, a plurality of energy storage devices, a first door assembly and a second door assembly. The housing includes a first end and a second end. The plurality of energy storage devices are coupled within the housing. The first door assembly is pivotally coupled to the first end of the housing. The second door assembly is pivotally coupled to the first end of the housing adjacent the first door assembly. The first and second door assemblies each comprise an air distribution member configured to distribute and direct a cooling air flow toward the plurality of energy storage devices to absorb heat energy from the plurality of energy storage devices.

Another embodiment relates to a modular energy storage system including a housing, a plurality of energy storage devices and a door assembly. The door assembly includes a door panel, an air distribution member and a cooling device. The plurality of energy storage devices are coupled within the housing. The door assembly is pivotally coupled to the housing. The air distribution member is removably coupled to a first surface of the door panel. The cooling device is coupled to a second surface of the door panel opposite the first surface. The cooling device is an air conditioning unit configured to provide a cooling air flow through the door panel to the air distribution member. The air distribution member is configured to distribute and direct the cooling air flow toward the plurality of energy storage devices to absorb heat energy from the plurality of energy storage devices.

Another embodiment relates to a modular energy storage system including a housing, a plurality of energy storage devices and a door assembly. The door assembly includes a door panel, an air distribution member and a cooling device. The plurality of energy storage devices are coupled within the housing. The door assembly is pivotally coupled to the housing. The air distribution member is removably coupled to a first surface of the door panel. The air distribution member includes a generally planar panel having a plurality of openings arranged along a perimeter thereof. The generally planar panel is positioned offset from the door panel. The cooling device is coupled to a second surface of the door panel opposite the first surface. The cooling device is an air conditioning unit configured to provide a cooling air flow through the door panel to the air distribution member. The air distribution member is configured to distribute and direct the cooling air flow through the plurality of openings toward the plurality of energy storage devices to absorb heat energy from the plurality of energy storage devices.

In some embodiments, the air distribution member includes a generally planar panel and a plurality of side panels oriented perpendicular to the generally planar panel to define an enclosure.

In some embodiments, the air distribution member includes a generally planar panel having a plurality of openings arranged along a perimeter thereof. The plurality of openings are configured to direct the cooling air flow toward the plurality of energy storage devices.

In some embodiments, the door assembly includes a shroud extending outwardly along a periphery of the air distribution member toward an interior of the housing. The shroud partially defines a cold aisle cooling area extending between the plurality of energy storage devices and the air distribution member.

In some embodiments, the door assembly includes a seal extending along at least a portion of the shroud, the seal being configured to seal off the cold aisle cooling area between the plurality of energy storage devices and the air distribution member.

In some embodiments, the door assembly includes a door panel including a first opening and a second opening disposed therein.

In some embodiments, the door assembly includes a cooling device coupled to the door panel. The cooling device is an air conditioning unit configured to provide the cooling air flow through the first opening of the door panel to the air distribution member.

In some embodiments, the door assembly includes an air return duct coupled to the door panel. The air return duct is configured to receive a return air flow from within the housing, and to direct the return air flow through the second opening of the door panel away from an interior of the housing.

DETAILED DESCRIPTION

Referring generally to the FIGURES, disclosed herein is a modular energy storage system that is space optimized and has improved thermal management capabilities. According to an exemplary embodiment, the modular energy storage system includes one or more energy storage devices (e.g., batteries, etc.), one or more power conversion assemblies, and a cooling system contained within a compact, easy-to-transport housing. The cooling system includes an air distribution member (e.g., an air baffle, etc.) for directing and distributing an air flow to cool various components contained within the system, such as, for example, batteries, power conversion electronics, system controls, and the like. In this way, the system has improved thermal management, which can reduce the likelihood of equipment failures, extend the life of one or more energy storage devices, reduce auxiliary power consumption from the system, and improve operating performance of the system.

In addition, the present disclosure provides for a power conversion assembly including an open-frame design to allow for improved temperature control/cooling of various electronic components coupled to the assembly and contained within, for example, a modular energy storage system. Furthermore, the assembly includes features that allow for improvements relating to transportability and mounting of the assembly.

Figure 1:
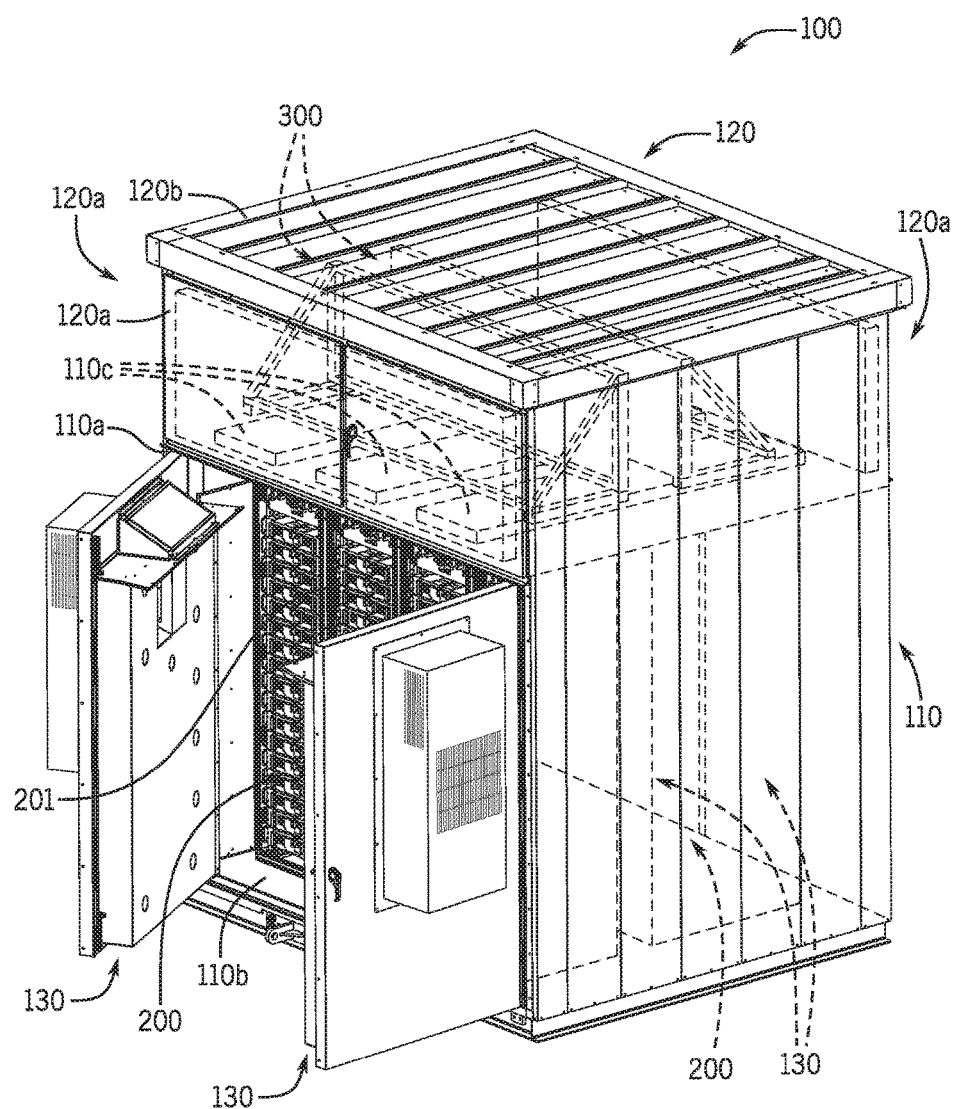
FIG. 1 is a perspective view of a modular energy storage system according to an exemplary embodiment.

Referring now to FIG. 1, a modular energy storage system 100 is shown according to an exemplary embodiment. In the embodiment of FIG. 1, the system 100 includes a lower housing 110 (e.g., a lower enclosure, a lower container, a lower portion, etc.) and an upper housing 120 (e.g., an upper enclosure, an upper container, an upper portion, etc.). According to the exemplary embodiment shown, the lower housing 110 and the upper housing 120 are integrally formed to define a single housing including upper and lower portions. According to another exemplary embodiment, the upper housing 120 is removably coupled or affixed to the lower housing 110. According to other exemplary embodiments, the upper housing 120 is permanently coupled or affixed to the lower housing 110 (e.g., via welds, etc.). According to an exemplary embodiment, the lower housing 110 is a standard ten foot ISO shipping container that has been configured for use as a modular energy storage system. According to other exemplary embodiments, the lower housing 110 is another type of standard container or enclosure configured for modular energy storage. The lower housing 110 can include features to allow for lifting or transporting of the system via a forklift or other lifting/transporting apparatus. In this way, the lower housing 110 and the upper housing 120 can be moved or transported as a single unit to different locations to provide energy storage solutions.

The lower housing 110 can house or contain, among other components, one or more racks 201 (e.g., equipment racks, battery racks, mounting frames, etc.). The racks 201 can hold a plurality of energy storage devices 200, such as batteries or the like. Similarly, the upper housing 120 can house or contain, among other components, one or more power conversion assemblies 300. According to other exemplary embodiments, the lower housing 110 can house the power conversion assemblies 300 along with one or more energy storage devices 200. According to an exemplary embodiment, the power conversion assemblies 300 can be electrically coupled to the energy storage devices 200. The modular energy storage system 100 can, advantageously, be deployed to a remote location to, for example, provide supplemental power or power smoothing to an electrical grid. Furthermore, the modular energy storage system 100 is configured such that a plurality of modular energy storage systems 100 can be communicably coupled together in a "plug-and-play" arrangement to build a larger energy storage system. In this way, the modular energy storage system 100 is scalable to meet the requirements of different applications.

Still referring to FIG. 1, the lower housing 110 includes two sidewalls 110a, a base 110b, one or more longitudinal members 110c defining an upper support section, and two pairs of door assemblies 130. The sidewalls 110a, the longitudinal members 110c, and the base 110b are coupled together or are integrally formed to collectively define a partial enclosure with an interior space. The door assemblies 130 are pivotally coupled to the lower housing 110 to provide access to the interior space. Each pair of door assemblies 130 is positioned at opposite ends of the lower housing 110. In this way, a person (e.g., an operator, a servicer, etc.) can access the interior of the lower housing 110 from either or both ends of the lower housing 110. Moreover, each of the door assemblies 130 includes a cooling device that can provide a cooling air flow from each end of the lower housing 110, to thereby create a hot/cold aisle cooling arrangement, the details of which are discussed in the paragraphs that follow. According to other exemplary embodiments, only a single door assembly 130 is pivotally coupled at one or both ends of the lower housing 110.

According to an exemplary embodiment, each of the longitudinal members 110c is coupled between a front and a rear portion of the lower housing 110. The longitudinal members 110c partially separate the interior of the lower housing 110 from the interior of the upper housing 120. According to other exemplary embodiments, the longitudinal members 110c are coupled between the two sidewalls 110a. The longitudinal members 110c are laterally spaced apart from each other along a substantially horizontal plane to define open spaces between the longitudinal members 110c and between the sidewalls 110a. These open spaces defined by the longitudinal members 110c allow for fluid communication (e.g., air flow) between the interior space of the lower housing 110 and the interior space of the upper housing 120. The longitudinal members 110c cooperatively define an upper support section of the lower housing 110. According to the exemplary embodiment of FIG. 1, the longitudinal members 110c provide structural support for one or more power conversion assemblies 300 removably coupled within the upper housing 120. According to various exemplary embodiments, the longitudinal members 110c can be metal extrusions, girders, or beams coupled to the lower housing 110. According to other exemplary embodiments, the longitudinal members 110c are another type of substantially rigid member sufficient to support various equipment thereon (e.g., a metal plate or sheet with openings therein, etc.).

According to various exemplary embodiments, the lower housing 110 can house various components or equipment therein, such as racks 201, energy storage devices 200, cooling system components, fire suppression equipment, system controls, and the like. According to the exemplary embodiment of FIG. 1, the lower housing 110 contains a plurality of racks 201 including a plurality of energy storage devices 200 coupled thereto. According to an exemplary embodiment, the lower housing 110 has a capacity to support about 200 kWh to about 500 kWh of energy storage therein. According to an exemplary embodiment, the energy storage devices 200 are batteries, such as lead-acid, lithium-ion, nickel metal hydride (NiMH), fuel cells, capacitors, or any other type of battery or energy storage device. As shown in the embodiment of FIG. 1, the racks 201 are arranged to define two parallel rows of energy storage devices 200 spaced apart from each other to define a gap or space therebetween. According to other exemplary embodiments, the racks 201 are arranged to define more or fewer than two rows of energy storage devices 200 within the lower housing 110. Each row of energy storage devices 200 extends between the two sidewalls 110a and has a generally rectangular shape. According to an exemplary embodiment, each rack 201 includes one or more air circulation devices 203 (see, for example, FIG. 4), such as a fan or other similar device for circulating an air flow through the racks 201 and past the energy storage devices 200.

According to the exemplary embodiment of FIG. 1, the upper housing 120 includes four sidewalls 120a and a top wall 120b. The sidewalls 120a and the top wall 120b are coupled together or are integrally formed to define an enclosure. The upper housing 120 can house, among other equipment, a plurality of power conversion assemblies 300, as shown in FIG. 1. According to other exemplary embodiments, the upper housing 120 contains only one power conversion assembly 300. According to an exemplary embodiment, one or more of the sidewalls 120a includes one or more pivotal access panels or doors to provide access to the interior of the upper housing 120. As shown in FIG. 1, the upper housing 120 is integrally formed with the lower housing 110. According to other exemplary embodiments, the upper housing 120 can be removably coupled to the lower housing 110 via one or more fasteners (e.g., bolts, screws, etc.), according to an exemplary embodiment. According to other exemplary embodiments, the upper housing 120 is permanently affixed to the lower housing 110 (e.g., welded, etc.).

Figure 2:
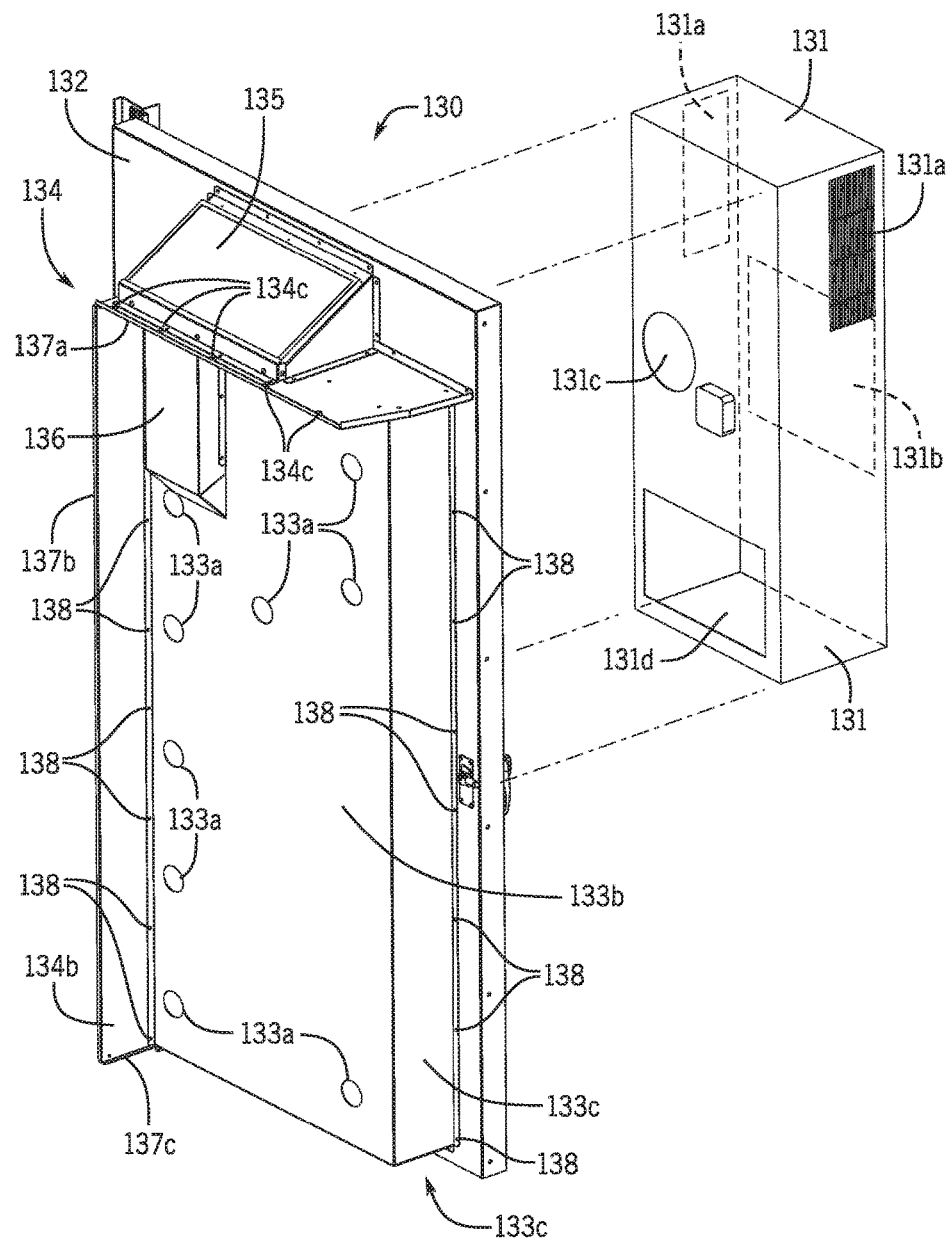
FIG. 2 is a perspective view of a door assembly for use in the modular energy storage system of FIG. 1.

Referring to FIG. 2, a door assembly 130 of FIG. 1 is shown according to an exemplary embodiment. FIG. 2 illustrates a right side door assembly, however, it is appreciated that the following description applies equally to a left side door assembly, as the door assemblies are mirror images of each other and are each similarly designed to allow for internal air distribution. As shown in FIG. 2, the door assembly 130 includes a cooling device 131, a door panel 132, an air distribution member 133 (e.g., air baffle, distribution plate, etc.), and a shroud 134 (e.g., flange, skirt, sidewall, etc.), among other components. The cooling device 131 can provide a cooling air flow through the door panel 132 to the air distribution member 133. The air distribution member 133 can, advantageously, distribute and direct the cooling air flow through a plurality of openings disposed in the air distribution member 133 to cool the power electronics contained within the lower housing 110 and the upper housing 120 (e.g., energy storage devices 200, power conversion assemblies 300, etc.). The air distribution member 133 is designed to maximize air velocity while minimizing temperature stratification between the air distribution member 133 and the energy storage devices 200. In this way, the air distribution member 133 can help to distribute and direct the cooling air flow to minimize a temperature differential within an interior of the lower housing 110 near or at the energy storage devices 200, and can maintain efficient and targeted temperature control of the energy storage devices 200.

According to an exemplary embodiment, the cooling device 131 is removably coupled to an outer portion or surface of the door panel 132. The cooling device 131 is shown as an air conditioning unit according to the exemplary embodiment of FIG. 2. According to other exemplary embodiments, the cooling device 131 can be a fan or any other source for providing a cooling air flow. As shown in FIG. 2, the cooling device 131 is exposed to ambient such that the cooling device 131 can receive an air flow from ambient through an air inlet 131a. The air flow can pass through a condenser of the cooling device 131 to generate, as a by-product, a warm air flow, which can pass through an opening 131b back to ambient. The cooling device 131 can provide a cooling air flow through an air outlet 131d to an opening (e.g., a first opening) in the door panel 132 and to the air distribution member 133. The cooling air flow can absorb heat energy from the power electronics contained within the lower housing 110 and the upper housing 120 (e.g., energy storage devices 200, power conversion assemblies 300, etc.). The cooling device 131 can receive a return air flow from the door assembly 130 through an air return inlet 131c. According to an exemplary embodiment, the return air flow is received from the upper housing 120 and/or the lower housing 110 through an air return duct 136.

Figure 3:
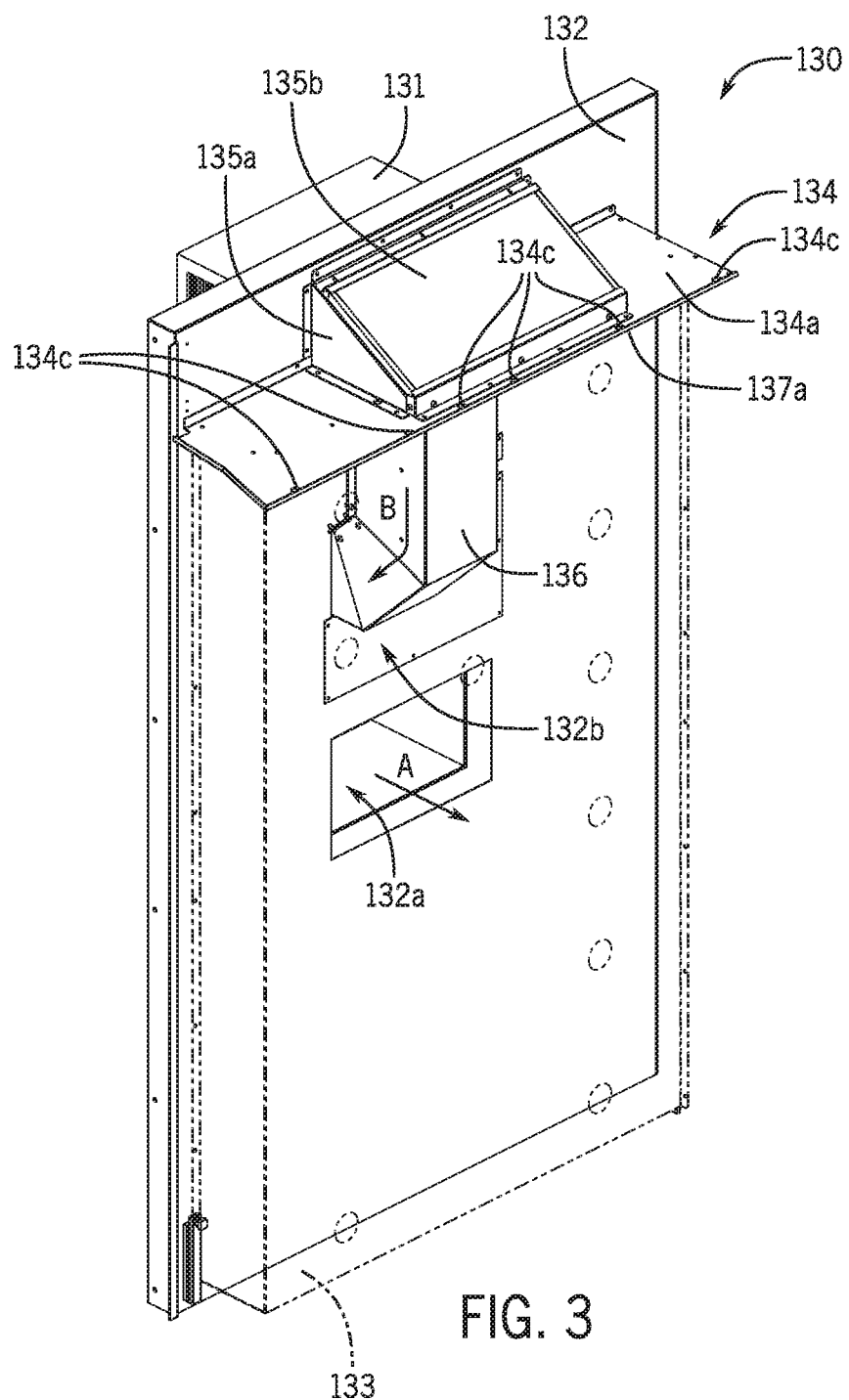
FIG. 3 is a perspective view of the door assembly of FIG. 2 with an air distribution member shown in phantom.

Still referring to FIG. 2, the door panel 132 includes openings that correspond with the air return inlet 131c and the air outlet 131d of the cooling device 131, respectively (see, for example, openings 132a and 132b of FIG. 3). The air distribution member 133 is removably coupled to an inner surface of the door panel 132, according to an exemplary embodiment. The air distribution member 133 is removably coupled to the door panel 132 via one or more fasteners 138 (e.g., bolts, screws, etc.) arranged along a periphery of the air distribution member 133. The air distribution member 133 and the door panel 132 cooperatively define an enclosure for receiving a cooling air flow from the cooling device 131.

According to an exemplary embodiment, the air distribution member 133 can be removed and replaced with a different air distribution member having different properties, such as a different overall size or different cooling properties (e.g., different hole size, different hole positioning, etc.). In this manner, the removability of the air distribution member 133 can allow for customization or reconfiguration of the modular energy storage system 100. For example, if the energy storage devices 200 are replaced with different energy storage devices having different cooling requirements, the air distribution member 133 can be replaced with a different air distribution member having different characteristics that facilitate targeted cooling of the new energy storage devices. Similarly, if one or more of the energy storage devices 200 is removed from the energy storage system, a different air distribution member 133 having a different number of holes and/or different hole positions can be used to target the remaining energy storage devices 200. In this manner, the removable air distribution member 133 allows for flexibility in the design of the energy storage system (e.g., storage capacity, etc.), while providing for efficient and targeted temperature control of the energy storage devices 200 contained therein. The air distribution member 133 can be easily removed and replaced in the field by an operator or a servicer.

According to an exemplary embodiment, the air distribution member 133 includes a generally planar panel 133b and one or more side panels 133c arranged perpendicular to the generally planar panel 133b to define a partial enclosure (e.g., an open box, a cavity, etc.). The partial enclosure or cavity defined by the air distribution member 133 can maximize the velocity of the cooling air flow received from the cooling device 110 before being distributed by the air distribution member 133.

Figure 4:
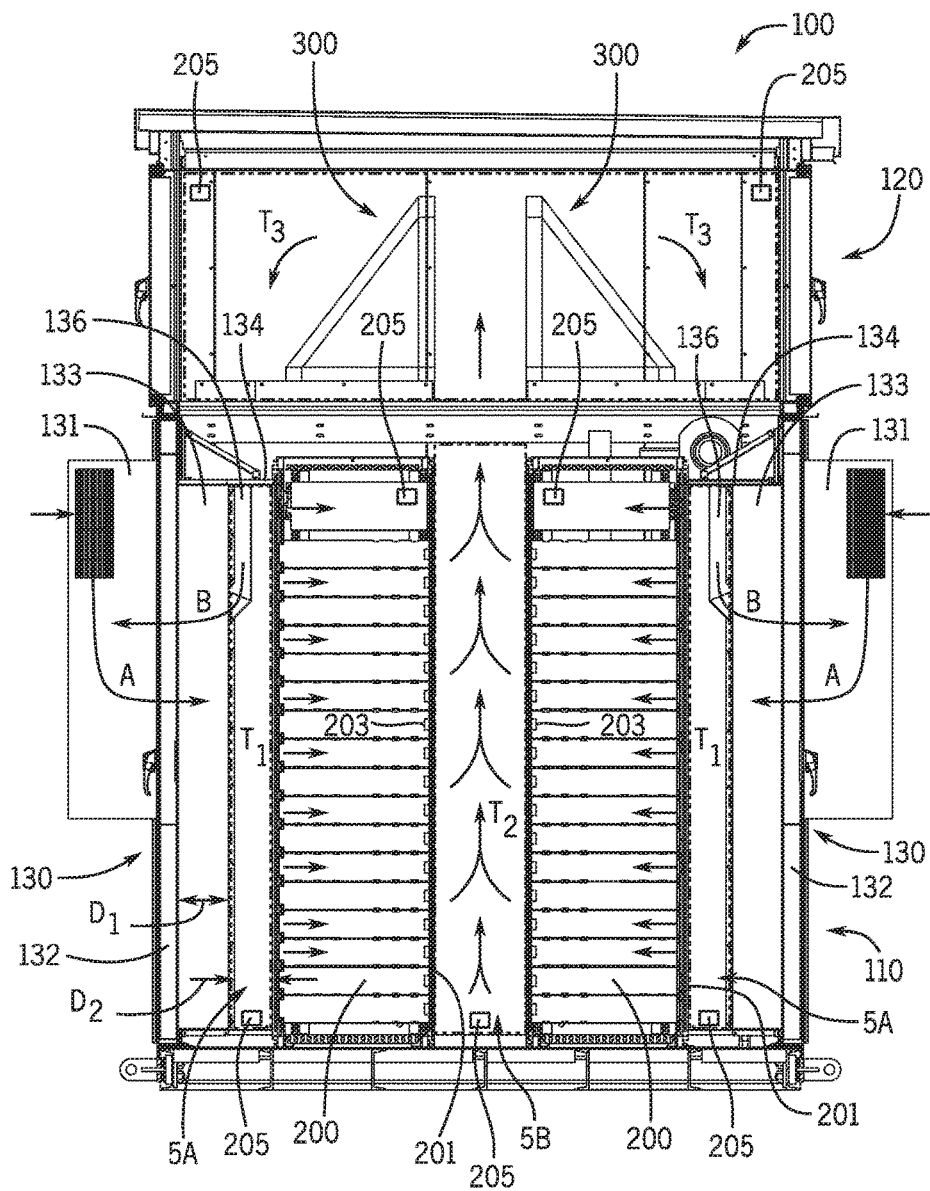
FIG. 4 is a cutaway side view of the modular energy storage system of FIG. 1 illustrating a hot/cold aisle cooling arrangement including air flows.

According to an exemplary embodiment, the distance or spacing between an inner surface of the door panel 132 and an inner surface of the generally planar panel 133b is 5" (inches) (see, for example, FIG. 4). According to other exemplary embodiments, the distance or spacing is in the range of 5" (inches) to 7" (inches). This spacing between the generally planar panel 133b and the door panel 132 can, advantageously, maximize the velocity of the cooling air flow received from the cooling device 110, to thereby provide effective cooling of, for example, the energy storage devices 200. As shown in FIG. 2, the generally planar panel 133b has a rectangular shape, although the panel 133b may have other shapes, such as circular, pentagonal, octagonal, or the like, according to other exemplary embodiments. According to an exemplary embodiment, the air distribution member 133 including the generally planar panel 133b and the side panels 133c are each made (e.g., formed, welded, etc.) from sheet metal, aluminum, or any other substantially rigid material suitable for the particular application within the modular energy storage system 100 (e.g., fiber glass, composite, plastic, etc.).

The air distribution member 133 further includes a plurality of openings 133a disposed within the generally planar panel 133b. The openings 133a are arranged along a perimeter of the generally planar panel 133b, such as along a side perimeter, a top perimeter, and/or a lower perimeter of the generally planar panel 133b. The openings 133a are generally located away from the center of the generally planar panel 133b, where the air outlet 131d of the cooling device 131 is generally aligned when the air distribution member 133 is coupled to the door panel 132. In this manner, the cooling air flow received from the cooling device 131 can be distributed throughout the enclosure or cavity defined by the air distribution member 133 and the door panel 132. According to an exemplary embodiment, the openings 133a are generally circular in shape, although other shapes are contemplated, such as oval, square, pentagonal, octagonal, or the like, according to other exemplary embodiments. According to an exemplary embodiment, the openings 133a each have a diameter in the range of 2" (inches) to 3" (inches).

According to the exemplary embodiment shown in FIG. 2, the door assembly includes an air return duct 136 configured to communicate with the air return inlet 131c of the cooling device 131. The air return duct 136 is separated or isolated from the enclosure defined between the door panel 132 and the air distribution member 133, which receives the cooling air flow from the cooling device 131. The air return duct 136 can receive a return air flow from the lower housing 110 and/or the upper housing 120, and can direct the return air flow through the door panel 132 to the cooling device 131 (e.g., to air return 131c of cooling device 131). According to the exemplary embodiment of FIG. 2, an air filter 135 is removably coupled to an inlet of the air return duct 136. The air filter 135 can filter particulates that may be present in a return air flow entering the return air duct 136 from the lower housing 110 and/or the upper housing 120.

Still referring to FIG. 2, the door assembly 130 further includes a top member 134a and a side member 134b, which cooperatively define a shroud 134 (e.g., a skirt, a flange, etc.) for the air distribution member 133. According to an exemplary embodiment, the shroud 134 can close off the partial enclosure or cavity defined by the air distribution member 133 and the door panel 132. In addition, the shroud 134 partially defines a cold aisle cooling area between the energy storage devices 200 and the air distribution member 133. For example, when a pair of door assemblies 130 are pivotally coupled adjacent each other at each end of the lower housing 110, the corresponding shrouds 134 of a pair of adjacent door assemblies 130 cooperate to define a cold aisle cooling area between the respective air distribution members 133 and a row of energy storage devices 200. Thus, each pair of adjacent door assemblies 130 can cooperate to define two separate cold aisle cooling areas at each end of the lower housing 110 (see, for example, FIG. 5).

As shown in FIG. 2, the top member 134a is coupled to a top edge of the air distribution member 133, and the side member 134b is coupled to a side edge of the air distribution member 133. The top member 134a and the side member 134b extend inward from the door panel 132 toward an interior of the lower housing 110 (see, for example, FIGS. 1 and 4). The top member 134a and the side member 134b each extend past the generally planar member 133b a distance sufficient to engage or mate with at least a portion of the rack(s) 201 and/or the energy storage devices 200 when the door assembly 130 is at a closed position. According to an exemplary embodiment, the top member 134a and the side member 134b extend past the generally planar member 133b a distance of 5" (inches).

According to an exemplary embodiment shown in FIG. 4, the shroud 134 can form a seal against the racks 201 and/or energy storage devices 200 when the door assembly 130 is at a closed position. In this way, the shroud 134 can help to isolate or seal off the cold aisle cooling area between the energy storage devices 200 and the door assembly 130. For example, according to the exemplary embodiment of FIG. 2, the top member 134a includes a top seal 137a, and the side member 134b includes a side seal 137b and a bottom seal 137c. The top seal 137a, the side seal 137b, and the bottom seal 137c collectively define a perimeter seal configured to mate or engage with one or more of the racks 201 and/or the energy storage devices 200 when the door assembly 130 is at a closed position. In this way, a cooling air flow distributed by the air distribution member 133 can be contained or directed by the shroud 134 toward the energy storage devices 200 within the cold aisle cooling area. According to an exemplary embodiment, the top seal 137a, the side seal 137b, and/or the bottom seal 137c is a bulb seal. According to other exemplary embodiments, the seals 137a, 137b, and/or 137c can be any other member suitable to create a seal between the shroud 134 and the racks and/or energy storage devices 200 (e.g., a brush, etc.).

According to the exemplary embodiment of FIG. 2, the top member 134a includes a plurality of apertures 134c. The apertures 134c can provide an air pressure relief for the cold aisle cooling area when a cooling air flow is distributed by the air distribution member 133 to the energy storage devices 200. In this manner, the apertures 134c can help to improve air flow and/or air distribution within the cold aisle cooling area. As shown in FIG. 2, the apertures 134c are arranged along a periphery of the top member 134a. The apertures 134c have a circular shape, although the apertures 134c may have other shapes, such as oval, square, pentagonal, octagonal, or the like, according to other exemplary embodiments. According to an exemplary embodiment, the apertures 134c each have a diameter of 1" (inch) to achieve optimum air flow within the cold aisle cooling area.

Referring to FIG. 3, the door assembly 130 of FIG. 2 is shown with the air distribution member 133 shown in phantom to illustrate the structure of the door panel 132. As shown in FIG. 3, the door panel 132 includes a first opening 132a (e.g., a supply opening, an inlet, etc.) and a second opening 132b (e.g., a return opening, an outlet, etc.). The first opening 132a can communicate with the cooling device 131 to provide a cooling air flow represented by arrow "A" from the cooling device 131 to the air distribution member 133. According to an exemplary embodiment, the first opening 132a is generally rectangular in shape, and has a size of 10" (inches) by 15" (inches). According to other exemplary embodiments, the first opening 132a can have a different shape and size, as would be appreciated by one of ordinary skill in the art. The second opening 132b can allow the air return duct 136 to communicate with the air return of the cooling device 131, to thereby provide a return air flow represented by arrow "B" from the interior of the upper housing 120 and/or the lower housing 110 to the cooling device 131. According to an exemplary embodiment, the second opening 132b has a generally square shape, and has a size of 8" (inches) by eight 8" (inches), although the second opening 132b can have a different shape and size, according to other exemplary embodiments.

Referring to FIG. 4, a thermal model for the modular energy storage system 100 is shown according to an exemplary embodiment. In this embodiment, the system 100 is shown as a cutaway side view to illustrate the interior of the system 100 with a cooling air flow circulating therein. As shown in FIG. 4, the air distribution member 133 and the shroud 134 of the door assembly 130 cooperatively define a cold aisle cooling area 5A adjacent the energy storage devices 200 at each end of the lower housing 110. In addition, the two rows of energy storage devices 200/racks 201 define a hot aisle area 5B located between the two rows near a middle portion of the lower housing 110.

As shown in FIG. 4, the cooling device 131 provides a cooling air flow indicated by arrow "A" through an opening in the door panel 132 (e.g., opening 132a shown in FIG. 3). The air flow "A" enters the enclosure defined by the air distribution member 133, the door panel 132, and the shroud 134 of each pair of door assemblies 130. According to an exemplary embodiment, the air distribution member 133 is offset from the door panel 132 a distance $D_1$ in the range of 5" (inches) to 7" (inches), which can, advantageously, help to distribute the air flow throughout the enclosure before being distributed and directed by the air distribution member 133. Furthermore, this distance or depth can help to maximize air velocity, while minimizing temperature stratification within the cold aisle cooling area 5A. According to an exemplary embodiment, the air distribution member 133 can maintain a temperature delta of less than about 3 degrees Celsius within the cold aisle cooling area 5A during operation of the energy storage devices 200 (e.g., when providing or absorbing power). The air flow can then be distributed and directed through the respective openings 133a of the air distribution member 133 to the cold aisle cooling area 5A toward the associated energy storage devices 200. In this area, the air flow has a temperature $T_1$ in the range of 15 degrees Celsius to 25 degrees Celsius. According to an exemplary embodiment, the outer surface of the air distribution member 133 is positioned a distance $D_2$ of 5" (inches) away from the energy storage devices 200.

The distributed air flow can then pass through the support racks 201 past the energy storage devices 200 to absorb at least a portion of the heat energy from the energy storage devices 200, to thereby cool the energy storage devices 200. According to an exemplary embodiment, the air flow is circulated through the racks 201 and past the energy storage devices 200 via one or more air circulation devices 203 (e.g., fans, etc.) coupled to the racks 201. The air flow can then enter the hot aisle area 5B located between the two rows of energy storage devices 200 and the racks 201. In this area, the air flow has a temperature $T_2$, which is higher than temperature $T_1$ of the cold aisle cooling area 5A, due to the absorption of heat energy from the energy storage devices 200. According to an exemplary embodiment, the temperature $T_2$ can be in the range of 25 degrees Celsius to 35 degrees Celsius. The air flow can then flow generally upward through the hot aisle 5B and through the open spaces between the longitudinal members 110c toward the power conversion assemblies 300. The air flow can flow past the power conversion assemblies 300 to absorb heat energy generated by the power conversion assemblies 300, to thereby provide effective thermal management/cooling of the power conversion assemblies 300 (the details of which are discussed further below). In this area, after absorbing heat energy from the power conversion assemblies 300, the air flow has a temperature $T_3$ in the range of 30 degrees Celsius to 40 degrees Celsius. The return air flow, represented by arrow "B," can then flow to the air filter 135 and through the air return duct 136 to the cooling device 131 for recirculation.

Figure 6:
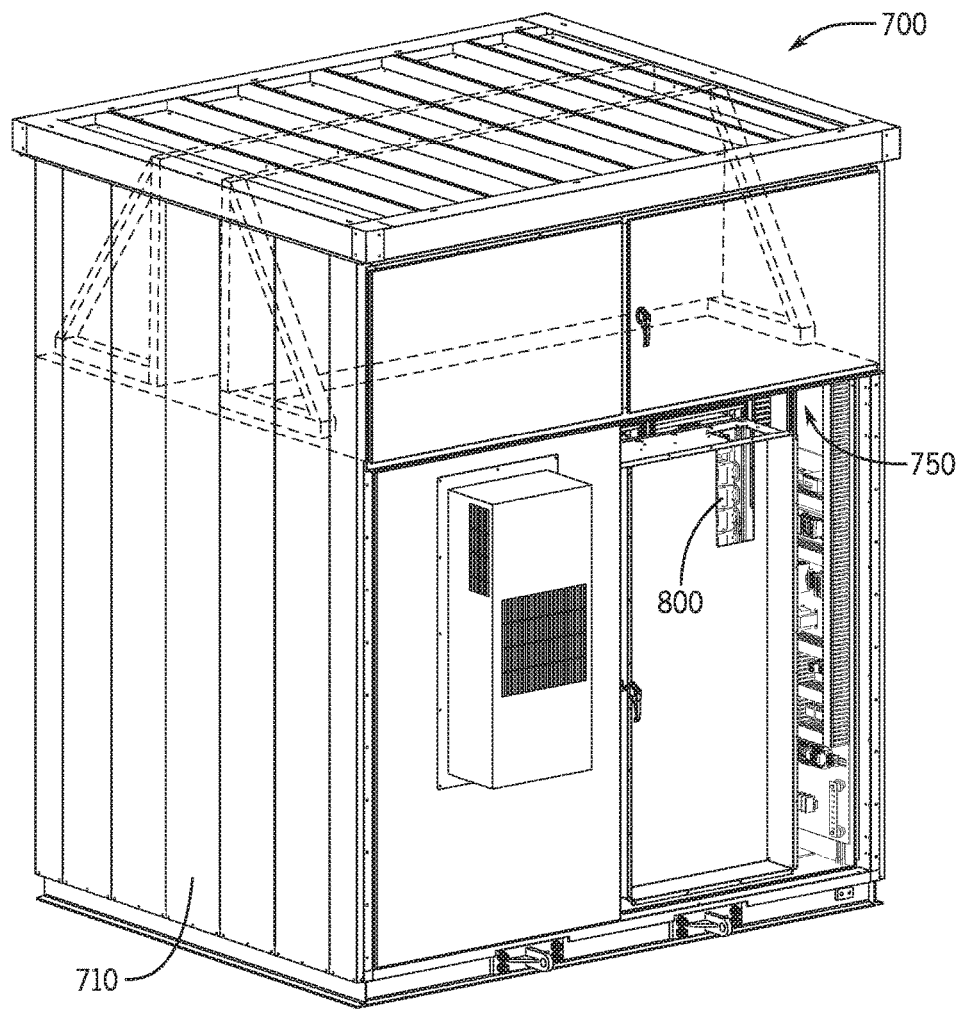
FIG. 6 is a perspective view of a modular energy storage system including a fire suppression system according to an exemplary embodiment.
Figure 7:
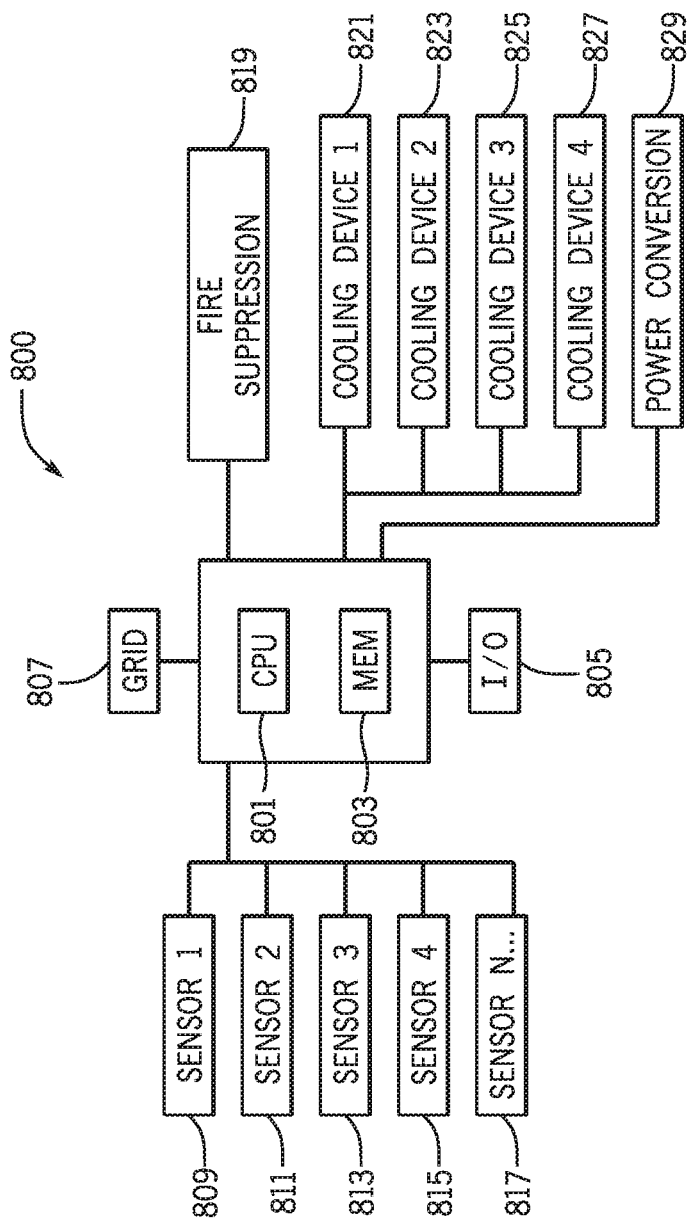
FIG. 7 is a schematic view of a control system for a modular energy storage system according to an exemplary embodiment.

According to an exemplary embodiment shown in FIG. 7, the modular energy storage system includes a control system 800 for controlling various functions of the system, such as the cooling devices 131, the energy storage devices 200, the air circulation devices 203, temperature/humidity sensors 205 (see FIG. 4), power conversion assemblies 300 and fire suppression equipment 750 (shown in FIG. 6). As shown in FIG. 7, the control system 800 includes a central processing unit (CPU) 801, a memory 803, and input/output port 805. The CPU 801 and memory 803 are communicably coupled to the electrical grid 807. One or more sensors 809-817 may be communicably coupled to the CPU 801 (e.g., temperature/humidity sensors 205, etc.). The sensors 809-817 can transmit temperature data and/or humidity data to the CPU 801. The temperature data and/or humidity data may be indicative of a surrounding temperature/humidity in the lower housing 110, the upper housing 120, at the support racks 201, or internal to the energy storage devices 200. The CPU 801 is communicably coupled to each of the cooling devices 131, represented schematically as cooling device inputs 821-827 in FIG. 7. The CPU 801 can control the operation of the cooling devices of each door assembly 130 in response to the temperature/humidity data obtained from the sensors 809-817.

For example, the control system 800 may be configured to maintain a particular temperature within the lower housing 110, in the upper housing 120, at the support racks 201, or within the energy storage devices 200 during operation. In this manner, the modular energy storage system 100 can provide effective thermal management for the various electronic components contained within the lower housing 110 and the upper housing 120, and can optimize the run time for the cooling devices 131, to thereby maximize system efficiency. The sensors 809-817 may be provided within each of the cold aisle cooling areas 5A and the hot aisle area 5B for monitoring a surrounding air temperature (see, for example, sensors 205 in FIG. 4). In addition, the sensors 809-817 may be provided within the cells of the energy storage devices 200 to, for example, monitor a cell temperature during operation of the energy storage devices 200.

Figure 5:
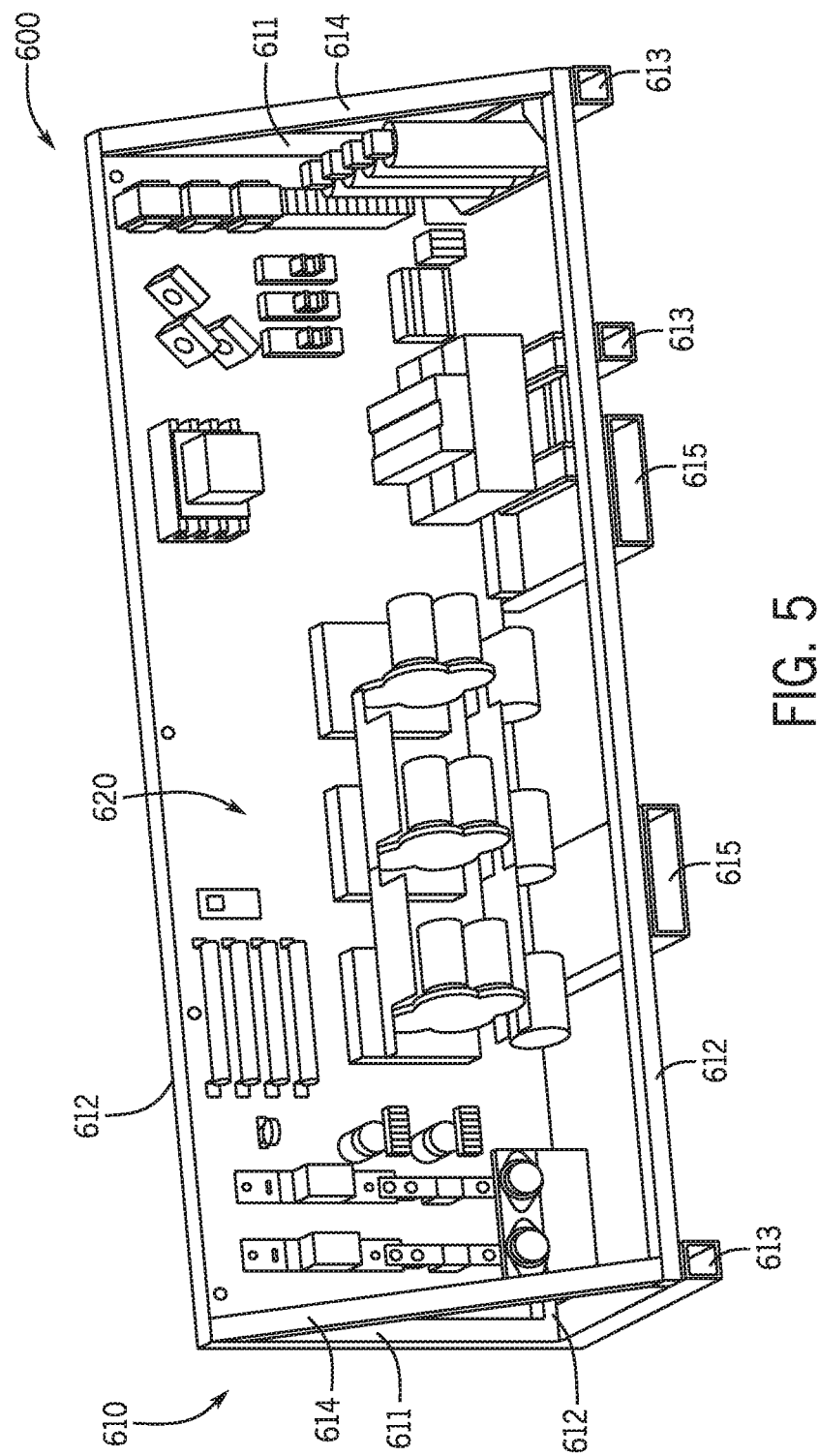
FIG. 5 is a perspective view of a power conversion assembly according to an exemplary embodiment.

Referring now to FIG. 5, a power conversion assembly 600 is shown according to an exemplary embodiment. The power conversion assembly 600 is identical to the power conversion assembly 300 illustrated in FIGS. 1 and 4. The power conversion assembly 600 includes a frame assembly 610 and a panel 620 including a plurality of electronic components. According to an exemplary embodiment, various electronic components are coupled to (or integrated in) the panel 620 and/or the frame assembly 610, such as, for example, power conversion electronics (e.g., power converters, etc.), a controller (e.g., control system 800 of FIG. 7), battery management system controls, frequency response controls, grid monitoring/response controls, and the like.

According to an exemplary embodiment, one or more power conversion assemblies 600 can be removably coupled within, for example, the upper housing 120 of the modular energy storage system 100, such as to one or more of the longitudinal members 110c. For example, referring to FIGS. 1 and 4, a pair of power conversion assemblies 300 are shown coupled within the upper housing 120 in a back-to-back arrangement, and arranged generally above a hot aisle area 5B. According to other exemplary embodiments, the power conversion assemblies 600 can be coupled within the lower housing 110 adjacent the energy storage devices 200. It is appreciated that the power conversion assemblies 600 may be coupled within other types of enclosures or modular energy storage systems having different configurations, according to other exemplary embodiments.

According to an exemplary embodiment, the power conversion assembly 600 can be electrically coupled to the energy storage devices 200 and to the cooling device(s) 131 of the modular energy storage system 100 via a control system, such as control system 800 shown in FIG. 7. The power conversion assembly 600 can convert AC to DC power and vice versa, such as between the energy storage devices 200 and a load (e.g., an electrical power grid 807, a renewable energy power source, etc.), according to an exemplary embodiment. Additionally, the power conversion assembly 600 can include the control system 800 (e.g., an integrated controller, etc.) to provide electronic control of the cooling devices 131, the energy storage devices 200, and/or other devices/systems of the modular energy storage system (e.g., fire suppression system 750 shown in FIG. 6, etc.).

As shown in FIG. 5, the frame assembly 610 includes a pair of end members 611 coupled to or fixedly attached to a pair of elongated members 612, to thereby define a generally planar frame section. The end members 611 and the elongated members 612 are arranged to define a rectangular outer frame, and are configured to receive the panel 620 thereon. The frame assembly 610 further includes two or more base members 613 coupled thereto and oriented perpendicular to the end members 611. The base members 613 extend generally outward away from the end members 611 to form an "L" shape with the end members 611. One or more gussets 614 are coupled between the end members 611 and the base members 613, respectively, to provide structural support for the frame assembly 610. A third elongated member 612 is coupled between the base members 613 at a distal end of each base member. A pair of tubular members 615 are coupled between the two base members 613, and are spaced laterally apart from each other to define open areas between the base members 613 and the pair of tubular members 615, respectively. The base members 613, the tubular members 615, and the third elongated member 612 collectively define a base of the frame assembly 610. According to an exemplary embodiment, the power conversion assembly 600 can be removably coupled to, for example, one or more longitudinal members 110c of the lower housing 110 via the base members 613 and/or the tubular members 615 (e.g., using fasteners, such as bolts, screws, etc.).

According to an exemplary embodiment, each of the tubular members 615 is sized and shaped to receive a fork of a forklift for moving/transporting the power conversion assembly 600. In this way, the power conversion assembly 600 can be easily moved or transported to different locations. According to various exemplary embodiments, each of the members that make up the frame assembly 610 can be square or circular tubing made of steel, aluminum, or any other substantially rigid material or combinations of materials suitable for supporting various electronic components in, for example, the modular energy storage system 100. According to an exemplary embodiment, the various members that make up the frame assembly 610 are fixedly coupled to each other via welds, rivets, or the like. According to other exemplary embodiments, the various members are removably coupled to each other via removable fasteners, such as bolts, screws, or the like.

Still referring to FIG. 5, the panel 620 is removably coupled to the frame assembly 610 on the generally planar frame section defined by the two end members 611 and the pair of elongated members 612. According to an exemplary embodiment, the panel 620 includes electronic components that are generally exposed to ambient, so as to receive a cooling air flow within, for example, the modular energy storage system 100. The panel 620 is oriented in a generally upright direction when the assembly 600 is coupled within, for example, the upper housing 120. This orientation, advantageously, facilitates cooling of the electronic components coupled to or integrated into the panel 620 (and/or on the frame assembly 610), because a cooling air flow can pass upward through the various openings of the frame assembly 610 to cool the components via convection (e.g., through the open spaces defined between the base members 613 and the tubular members 615 and/or between the gussets 614 and the base members 613, etc.).

For example, referring to FIG. 4, which illustrates the modular energy storage system 100 including power conversion assemblies 300 (which are identical to the power conversion assemblies 600 and are used interchangeably throughout this disclosure), a cooling air flow can enter the hot aisle area 5B after absorbing heat energy from the energy storage devices 200. The air flow can travel upward through the hot aisle area 5B toward, for example, the power conversion assemblies 600. According to an exemplary embodiment, the air flow can pass upward through the open spaces defined by the base members 613 and the tubular members 615 of each power conversion assembly. Likewise, an air flow can pass through other open areas of the frame assembly 610, such as between the gussets 614 and the base members 613 toward the panel 620. In this way, a cooling air flow can flow past the electronic components coupled to or integrated in the panel 620 and/or the frame assembly 610 to absorb heat energy generated by these electronic components. According to an exemplary embodiment, the air flow received from the hot aisle 5B has a temperature sufficient to absorb heat energy from the various electronic components of the power conversion assemblies 600, to thereby provide effective cooling and thermal management thereof.

Referring now to FIG. 6, a modular energy storage system 700 is shown including a fire suppression system 750 according to an exemplary embodiment. The fire suppression system 750 is electrically coupled to a control system of the modular energy storage system 700, such as control system 800 shown in FIG. 7 (see, for example, fire suppression system input 819). The fire suppression system 750 can automatically control or extinguish fires within the modular energy storage system 700, without human intervention. For example, according to an exemplary embodiment, the modular energy storage system includes one or more temperature monitoring devices (e.g., sensors, etc.) operatively coupled to, for example, energy storage devices 800 contained within the lower housing 710 of the system 700 and/or within the cold aisle cooling areas 5A and the hot aisle area 5B (see, for example, FIG. 4). The temperature monitoring devices can be electrically coupled to the control system (e.g., control system 800) to provide data indicative of an operating temperature of the energy storage devices 800. The control system can be configured to provide a control signal to the fire suppression system 750 in the event that the temperature data exceeds a threshold value to indicate an overheating condition of the energy storage devices 800 (e.g., a fire, etc.). In response to receiving the control signal, the fire suppression system 750 can be operated via the control system to extinguish/control a fire or other event relating to an overheating condition of the energy storage devices 800. According to various exemplary embodiments, the fire suppression system 750 can be a sprinkler system, a gaseous fire suppression system, or a condensed aerosol fire suppression system.

In the various exemplary embodiments described herein, CPU 801 may be implemented as a general-purpose processor, an application specific integrated circuit (ASIC), one or more field programmable gate arrays (FPGAs), a digital-signal-processor (DSP), a group of processing components, or other suitable electronic processing components. Memory 803 is one or more devices (e.g., RAM, ROM, Flash Memory, hard disk storage, etc.) for storing data and/or computer code for facilitating the various processes described herein. Memory 803 may be or include non-transient volatile memory or non-volatile memory. Memory 803 may include database components, object code components, script components, or any other type of information structure for supporting the various activities and information structures described herein. Memory 803 may be communicably connected to central processing unit 801 and provide computer code or instructions to central processing unit 801 for executing the processes described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement as illustrated for the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements illustrated as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application.

What is claimed is:

1. A modular energy storage system, comprising:
a housing including a first end and a second end;
a plurality of energy storage devices coupled within the housing;
a first door assembly pivotally coupled to the first end of the housing; and
a second door assembly pivotally coupled to the first end of the housing adjacent the first door assembly, wherein the first and second door assemblies each comprise:
a door panel including a first opening and a second opening;
a cooling device configured to receive air via an air inlet and to provide a cooling air flow under pressure through the first opening; and
an air distribution member configured to receive the cooling air flow and including a plurality of apertures configured to direct a corresponding plurality of cooling air flows toward the plurality of energy storage devices.

2. The modular energy storage system of claim 1, wherein the air distribution members are each configured to receive, distribute, and direct pressurized air flow and each include a generally planar panel and a plurality of side panels oriented perpendicular to the generally planar panel to define an enclosure.

3. The modular energy storage system of claim 1, wherein the air distribution members each include a generally planar panel having a plurality of openings arranged along a perimeter thereof, and wherein the plurality of openings are configured to direct the cooling air flow toward the plurality of energy storage devices to absorb heat energy from the plurality of energy storage devices.

4. The modular energy storage system of claim 1, wherein each of the first and second door assemblies further comprise a shroud extending outwardly along a periphery of the air distribution member toward an interior of the housing, and wherein the shrouds cooperatively define a cold aisle cooling area extending between the plurality of energy storage devices and the air distribution members.

5. The modular energy storage system of claim 4, wherein each of the first and second door assemblies further comprise a seal extending along at least a portion of the shroud, the seal being configured to seal off the cold aisle cooling area between the plurality of energy storage devices and the air distribution member.

6. The modular energy storage system of claim 1 wherein each of the first and second door assemblies further comprise an air return duct coupled to the door panel, the air return duct being configured to:
receive a return air flow from within the housing; and
direct the return air flow through the second opening of the door panel away from an interior of the housing.

7. A modular energy storage system, comprising:
a housing;
a plurality of energy storage devices coupled within the housing; and
a door assembly pivotally coupled to the housing, the door assembly comprising:
a door panel;
an air distribution member removably coupled to a first surface of the door panel; and
a cooling device coupled to a second surface of the door panel opposite the first surface,
wherein the cooling device is an air conditioning unit configured to provide a cooling air flow under pressure through the door panel to the air distribution member, and
wherein the air distribution member:
is configured to receive the cooling air flow; and
includes a plurality of apertures configured to direct a corresponding plurality of cooling air flows toward the plurality of energy storage devices to absorb heat energy from the plurality of energy storage devices.

8. The modular energy storage system of claim 7, wherein the air distribution member includes a generally planar panel and a plurality of side panels oriented perpendicular to the generally planar panel to define an enclosure, and wherein the generally planar panel is positioned offset from the door panel.

9. The modular energy storage system of claim 7, wherein the air distribution member includes a generally planar panel having a plurality of openings arranged along a perimeter thereof, and wherein the plurality of openings are configured to direct the cooling air flow toward the plurality of energy storage devices.

10. The modular energy storage system of claim 7, wherein the door assembly further comprises a shroud extending outwardly along a periphery of the air distribution member toward an interior of the housing, and wherein the shroud partially defines a cold aisle cooling area extending between the plurality of energy storage devices and the air distribution member.

11. The modular energy storage system of claim 10, wherein the door assembly further comprises a seal extending along at least a portion of the shroud, the seal being configured to seal off the cold aisle cooling area between the plurality of energy storage devices and the air distribution member.

12. The modular energy storage system of claim 7, wherein the door panel includes a first opening and a second opening disposed therein, and wherein the cooling device is configured to provide the cooling air flow through the first opening of the door panel to the air distribution member.

13. The modular energy storage system of claim 12, wherein the door assembly further comprises an air return duct coupled to the door panel, the air return duct being configured to:
receive a return air flow from within the housing; and
direct the return air flow through the second opening of the door panel away from an interior of the housing.

14. A modular energy storage system, comprising:
a housing;
a plurality of energy storage devices coupled within the housing; and
a door assembly pivotally coupled to the housing, the door assembly comprising:
a door panel;
an air distribution member removably coupled to a first surface of the door panels, the air distribution member including a generally planar panel positioned offset from the door panel and having a plurality of openings arranged along a perimeter thereof; and
a cooling device coupled to a second surface of the door panel opposite the first surface, wherein:
the cooling device is an air conditioning unit configured to force a cooling air flow through the door panel to the air distribution member, the air distribution member is configured to receive the cooling air flow, and the plurality of openings are configured to direct a corresponding plurality of cooling air flows through the plurality of openings toward the plurality of energy storage devices to absorb heat energy from the plurality of energy storage devices.

15. The modular energy storage system of claim 14, wherein the door panel includes a first opening and a second opening disposed therein, and wherein the cooling device is configured to provide the cooling air flow through the first opening of the door panel to the air distribution member.

16. The modular energy storage system of claim 15, wherein the door assembly further comprises an air return duct coupled to the door panel, the air return duct being configured to:

receive a return air flow from within the housing; and direct the return air flow through the second opening of the door panel away from an interior of the housing.

17. The modular energy storage system of claim 14, wherein the door assembly further comprises a shroud extending outwardly along a periphery of the air distribution member toward an interior of the housing, and wherein the shroud partially defines a cold aisle cooling area extending between the plurality of energy storage devices and the air distribution member.

18. The modular energy storage system of claim 17, wherein the door assembly further comprises a seal extending along an edge of the shroud, the seal being configured to seal off the cold aisle cooling area between the plurality of energy storage devices and the air distribution member.

* * * * *

UNITED STATES PATENT AND TRADEMARK OFFICE
CERTIFICATE OF CORRECTION

PATENT NO. : 10,522,801 B2
APPLICATION NO. : 15/261576
DATED : December 31, 2019
INVENTOR(S) : Sriram Sarma Emani et al.

It is certified that error appears in the above-identified patent and that said Letters Patent is hereby corrected as shown below:

On the Title Page

Item (72)
Inventor No. 1 should be "Sriram Sarma Emani"
Inventor No. 2 should be "Tom Kronke"

Signed and Sealed this
Fourteenth Day of July, 2020

Andrei Iancu
*Director of the United States Patent and Trademark Office*